US010668883B2

(12) United States Patent
Bergstrom

(10) Patent No.: US 10,668,883 B2
(45) Date of Patent: Jun. 2, 2020

(54) DISPLAY DEVICE WITH LEVEL CORRECTION

(71) Applicant: Gentex Corporation, Zeeland, MI (US)

(72) Inventor: Stuart A. Bergstrom, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/001,017

(22) Filed: Jun. 6, 2018

(65) Prior Publication Data

US 2018/0354442 A1 Dec. 13, 2018

Related U.S. Application Data

(60) Provisional application No. 62/516,827, filed on Jun. 8, 2017.

(51) Int. Cl.
*B60R 21/015* (2006.01)
*B60R 1/12* (2006.01)
(Continued)

(52) U.S. Cl.
CPC .......... *B60R 21/01538* (2014.10); *B60R 1/04* (2013.01); *B60R 1/06* (2013.01); *B60R 1/12* (2013.01); *B60R 2001/1253* (2013.01)

(58) Field of Classification Search
CPC ...... B60R 21/01538; B60R 2001/1253; B60R 2300/101; B60R 11/04; B60R 1/00;
(Continued)

(56) References Cited

U.S. PATENT DOCUMENTS

| 4,837,551 | A | * | 6/1989 | Iino | ........................ G01P 1/08 340/461 |
| 5,028,912 | A | * | 7/1991 | Iino | ........................ G01P 1/08 340/461 |

(Continued)

FOREIGN PATENT DOCUMENTS

| CN | 106627366 A | 5/2017 |
| KR | 101609303 B1 | 10/2015 |
| WO | 2010028403 A1 | 3/2010 |

OTHER PUBLICATIONS

International Search Report and the Written Opinion of the International Searching Authority, International Application No. PCT US2018/036252, dated Nov. 1, 2018 (7 pages).

*Primary Examiner* — Hunter B Lonsberry
*Assistant Examiner* — Luis A Martinez Borrero
(74) *Attorney, Agent, or Firm* — Price Heneveld LLP; Bradley D. Johnson

(57) ABSTRACT

A display system for a vehicle comprises a display device including a screen disposed in a passenger compartment of the vehicle. The display device is configured to tilt relative to the vehicle and comprises an inertial sensor configured to output an acceleration signal. A controller is in communication with the display device and an imager configured to capture image data in a field of view rearward relative to the vehicle. The controller is operable to receive the acceleration signal and identify a direction of gravity from the acceleration signal. The controller is further configured to identify a reference direction from the image data and generate adjusted image data corrected for an angular offset of the display device between the direction of gravity and a vertical axis of the display device.

20 Claims, 4 Drawing Sheets

(51) Int. Cl.
*B60R 1/04* (2006.01)
*B60R 1/06* (2006.01)

(58) Field of Classification Search
CPC ........... B60R 1/04; B60R 1/06; B60R 21/015; H04N 5/2353; H04N 5/23238; H04N 5/23245; H04N 9/735
See application file for complete search history.

(56) References Cited

U.S. PATENT DOCUMENTS

| | | | |
|---|---|---|---|
| 5,734,357 A * | 3/1998 | Matsumoto | G02B 27/01 345/7 |
| 7,815,313 B2 * | 10/2010 | Ito | G08G 1/167 340/425.5 |
| 7,860,626 B2 * | 12/2010 | Breed | G01G 23/3728 180/271 |
| 8,065,053 B2 | 11/2011 | Stam et al. | |
| 8,259,174 B2 * | 9/2012 | Zhang | G06K 9/4647 348/148 |
| 8,543,254 B1 | 9/2013 | Schut et al. | |
| 8,577,169 B2 | 11/2013 | Andrus et al. | |
| 8,654,236 B2 * | 2/2014 | Shiozaki | H04N 5/23293 348/208.2 |
| 8,924,078 B2 | 12/2014 | Jeromin et al. | |
| 9,357,208 B2 * | 5/2016 | Gupta | H04N 17/00 |
| 9,491,450 B2 * | 11/2016 | Kussel | H04N 17/002 |
| 9,738,223 B2 * | 8/2017 | Zhang | H04N 17/002 |
| 9,767,695 B2 | 9/2017 | Hoek et al. | |
| 9,834,153 B2 * | 12/2017 | Gupta | G03B 43/00 |
| 9,836,966 B2 * | 12/2017 | Peterson | G08G 1/0962 |
| 10,202,077 B2 * | 2/2019 | Gupta | H04N 17/00 |
| 2004/0167697 A1 | 8/2004 | Albou et al. | |
| 2006/0164230 A1 * | 7/2006 | DeWind | B60K 35/00 340/461 |
| 2007/0262574 A1 * | 11/2007 | Breed | B60R 1/00 280/735 |
| 2008/0204566 A1 * | 8/2008 | Yamazaki | G03B 5/00 348/208.99 |
| 2010/0201814 A1 * | 8/2010 | Zhang | G06K 9/4647 348/148 |
| 2013/0038732 A1 * | 2/2013 | Waite | B60R 1/00 348/148 |
| 2013/0050530 A1 * | 2/2013 | Ge | H04N 5/2628 348/239 |
| 2013/0321629 A1 * | 12/2013 | Zhang | H04N 17/002 348/148 |
| 2014/0009499 A1 | 1/2014 | Gardenfors et al. | |
| 2014/0043473 A1 * | 2/2014 | Gupta | H04N 17/00 348/135 |
| 2014/0111637 A1 | 4/2014 | Zhang et al. | |
| 2014/0184799 A1 * | 7/2014 | Kussel | G01B 11/272 348/148 |
| 2015/0049193 A1 * | 2/2015 | Gupta | G03B 43/00 348/148 |
| 2015/0237311 A1 * | 8/2015 | Hattori | H04N 7/181 348/148 |
| 2016/0027298 A1 * | 1/2016 | Peterson | G08G 1/0962 340/935 |
| 2016/0137126 A1 * | 5/2016 | Fursich | B60R 1/00 348/38 |
| 2016/0267657 A1 * | 9/2016 | Gupta | H04N 17/00 |
| 2016/0277651 A1 * | 9/2016 | Sherman | H04N 5/2259 |
| 2017/0120829 A1 * | 5/2017 | Hasegawa | H04N 5/2351 |
| 2017/0327044 A1 * | 11/2017 | Baur | G08G 1/167 |
| 2018/0086284 A1 * | 3/2018 | Gupta | G03B 43/00 |
| 2018/0184006 A1 * | 6/2018 | Takagi | H04N 5/23212 |
| 2018/0297523 A1 * | 10/2018 | Tschirhart | H04N 7/183 |
| 2019/0111845 A1 * | 4/2019 | Karas | G08G 1/168 |

\* cited by examiner

DISPLAY DEVICE WITH LEVEL CORRECTION

CROSS-REFERENCE TO RELATED APPLICATION

This application claims priority to and the benefit under 35 U.S.C. § 119(e) of U.S. Provisional Patent Application No. 62/516,827 filed on Jun. 8, 2017, entitled "DISPLAY DEVICE WITH LEVEL CORRECTION," the entire disclosure of which is hereby incorporated herein by reference.

TECHNICAL FIELD

The present disclosure generally relates to a display system for a vehicle and, more particularly, to a display system providing a rearward view relative to the vehicle.

SUMMARY

According to one aspect of the present disclosure, a display system for a vehicle is disclosed. The system comprises a display device including a screen disposed in a passenger compartment of the vehicle. The display device is configured to tilt relative to the vehicle and comprises an inertial sensor configured to output an acceleration signal. A controller is in communication with the display device and an imager configured to capture image data in a field of view rearward relative to the vehicle. The controller is operable to receive the acceleration signal and identify a direction of gravity from the acceleration signal. The controller is further configured to identify a reference direction from the image data and generate adjusted image data corrected for an angular offset of the display device between the direction of gravity and a vertical axis of the display device. The controller controls the display device to display the adjusted image data.

According to another aspect of the present disclosure, a method for displaying image data on a vehicle display is disclosed. The method comprises detecting an angular orientation of the vehicle display relative to a vehicle and capturing image data in a field of view proximate to the vehicle. The method further comprises detecting at least one feature in the image data and identifying a reference direction based on the at least one feature. The reference direction is compared to the angular orientation of the vehicle display to generate a display offset. The display orientation of the image data is then offset by the display offset generating offset image data. The offset image data is displayed on the vehicle display.

According to yet another aspect of the present disclosure, a display system for a vehicle is disclosed. The system comprises a display device comprising a screen disposed in a passenger compartment of the vehicle. The display device is configured to rotate relative to the vehicle and comprises an inertial sensor configured to output an acceleration signal. A controller is in communication with the display device and an imager configured to capture image data in a field of view rearward relative to the vehicle. The controller is configured receive the acceleration signal and identify a direction of gravity from the acceleration signal. The controller is further configured to identify a plurality of lane lines in the image data and calculate an intersection of the lane lines. Based on the intersection of the lane lines, the controller identifies a horizon direction in the image data. The controller generates adjusted image data corrected for an angular offset of the display device between the direction of gravity and a vertical axis of the display device and displays the adjusted image data on the display device.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION OF EMBODIMENTS

Figure 1:
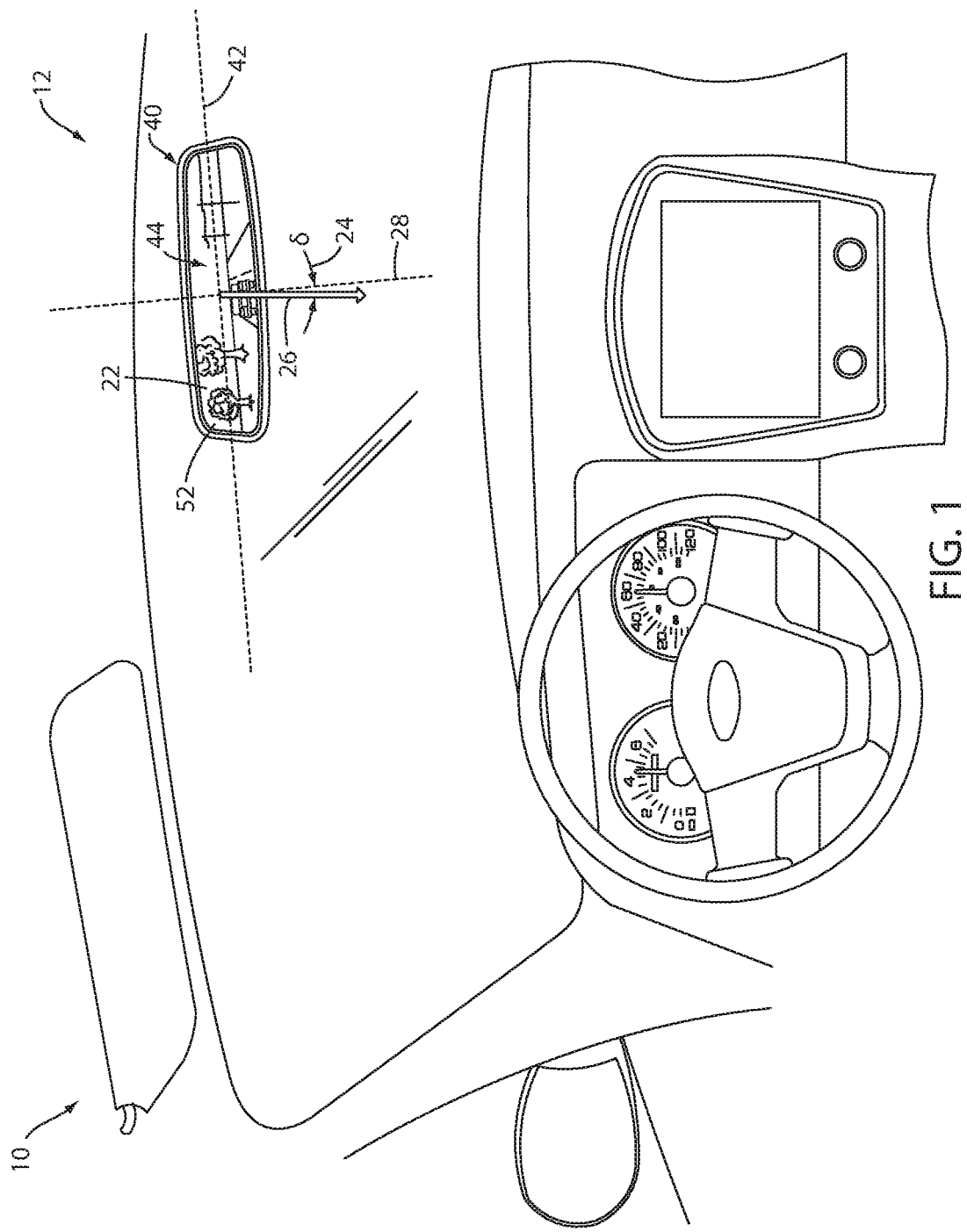
FIG. 1 is a projected view demonstrating an interior of a vehicle comprising a display system.

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 2:
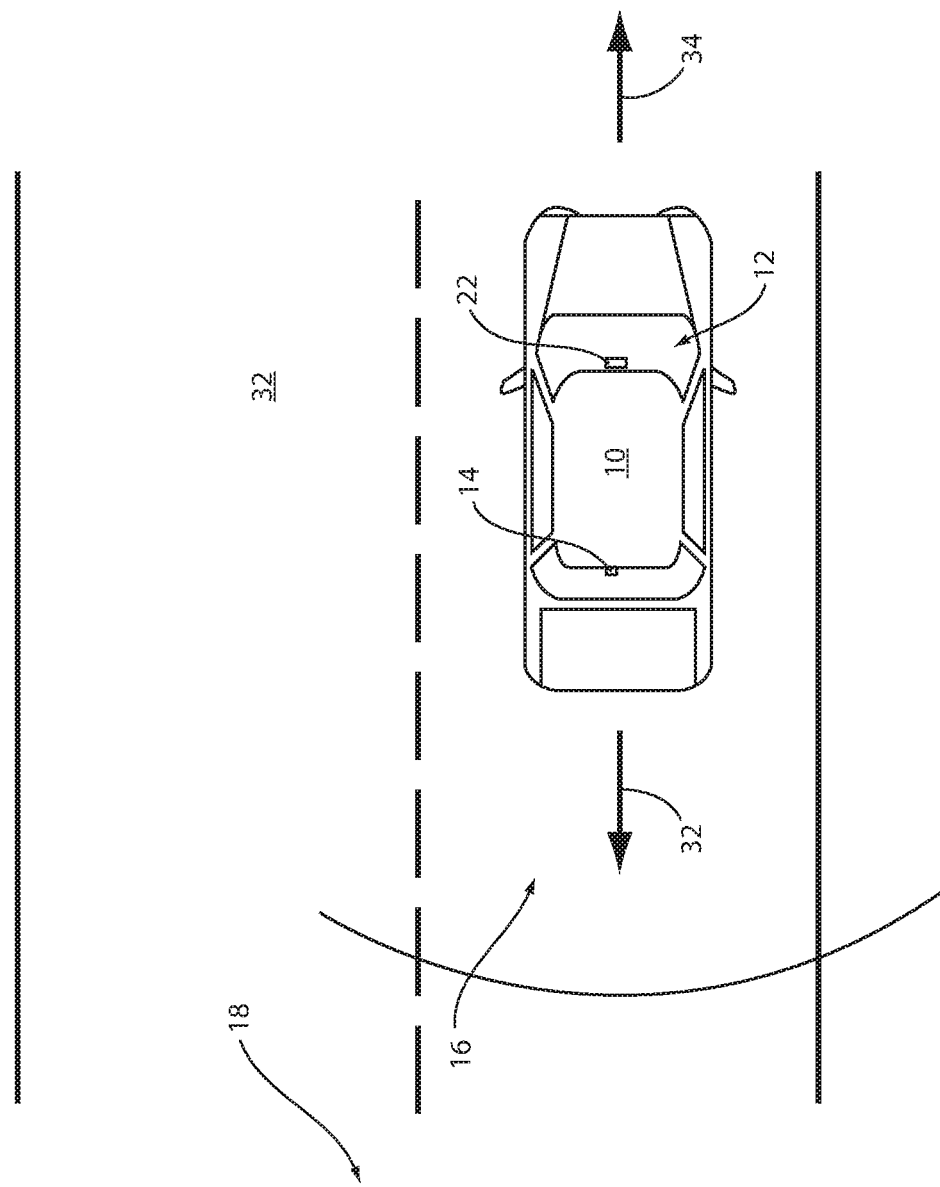
FIG. 2 is a top schematic view demonstrating a field of view of an imager of a display system.

Referring to FIGS. 1 and 2, a vehicle 10 is shown equipped with a display system 12. The display system 12 comprises an imager 14 configured to capture a field of view 16 comprising a rearward directed scene 18. The imager 14 is configured to capture image data 44 corresponding to the field of view 16 and display the image data 44 on a display device 22. In an exemplary embodiment, the display system 12 is operable to detect a tilt 24 or angular offset 6 of the device 22 in relation to gravity. As demonstrated in FIG. 1, the display device 22 may comprise an inertial sensor 40 configured to detect a gravitational force vector 26 relative to a vertical display axis 28 of the display device 22. Accordingly, the display system 12 may be configured to measure an angular offset 6 of the display device 22. Based on the angular offset 6, a controller of the display system 12 may orient the image data 44 to display an adjusted view 30

(demonstrated in FIG. 3C) corrected for the angular offset 6. The image data 44 displayed in FIG. 1 is not corrected to demonstrate an example of the appearance of the image data 44 on the display device 22 without the correction. As further discussed herein, the system 12 may correct the image data 44 to be displayed level with gravity to correct for the tilt 24.

The inertial sensor 40 may correspond to or comprise an accelerometer. The accelerometer may comprise a 3-axis accelerometer and may be configured to measure a range of approximately +/−4 g at a resolution of approximately 16-bits. The accelerometer may further be operable to operate in a wide range of temperatures and have an effective sampling rate of approximately 25 Hz. Accordingly, the inertial sensor 40 may output an acceleration signal to a controller of the display system 12. Based on the acceleration signal, the controller may identify the gravitational force vector 26 and compute the direction of gravity in relation to the vertical display axis 28 of the display device 22. Accordingly, though described as the gravitational force vector 26 herein, the controller may utilize the gravitational force vector 26 to identify the direction of gravity in relation to the vertical display axis 28 or any other reference direction of the display device 22. Though specific performance characteristics corresponding to the accelerometer are discussed herein, a variety of accelerometers may be utilized according to the particular precision, operating parameters of the controller, and the operating conditions/environments of the vehicle 10.

In an exemplary embodiment, the display device 22 may correspond to a rearview display device configured to provide a rearward directed view relative to the vehicle 10. In this configuration, the display system 12 is operable to display a series of images captured corresponding to scenes behind the vehicle 10. The imager 14 is in communication with the controller and comprises a pixel array configured to capture the image data 44 in the form of pixel information. In the various implementations discussed herein, the display system 12 is configured to process the image data 44 captured by the imager 14 and apply at least one image analysis technique to identify and display the corrected view.

Referring to FIG. 2, a top view of the vehicle 10 is shown illustrating the field of view 16. As previously described, the field of view 16 may be directed in a rearward direction 32 relative to a forward operating direction 34 of the vehicle 10. In this configuration, the series of images captured by the imager 14 may be displayed to provide a digital representation of the field of view 16. The digital representation of the field of view 16 may be adjusted to simulate the operation of a conventional rearview mirror. For example, when tilted or angled relative to the rearward direction 32, a conventional mirror may maintain the level appearance of the horizon and various features reflected from the rearward direction 32. Accordingly, in order to improve the appearance of the image data 44 on the display device 22, the display system 12 may process and manipulate the image data 44 to maintain a relationship to gravity such that the image data 44 appears level with a horizon.

Figure 3A:
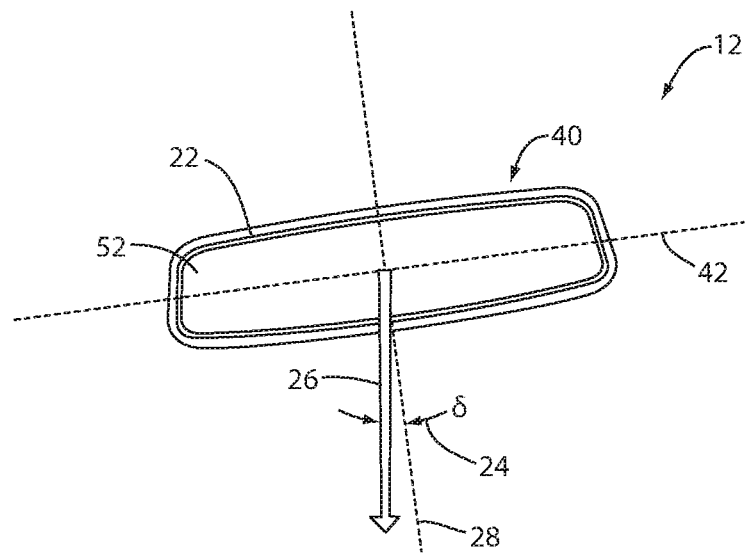
FIG. 3A is a schematic diagram of a display device of a display system.
Figure 3B:
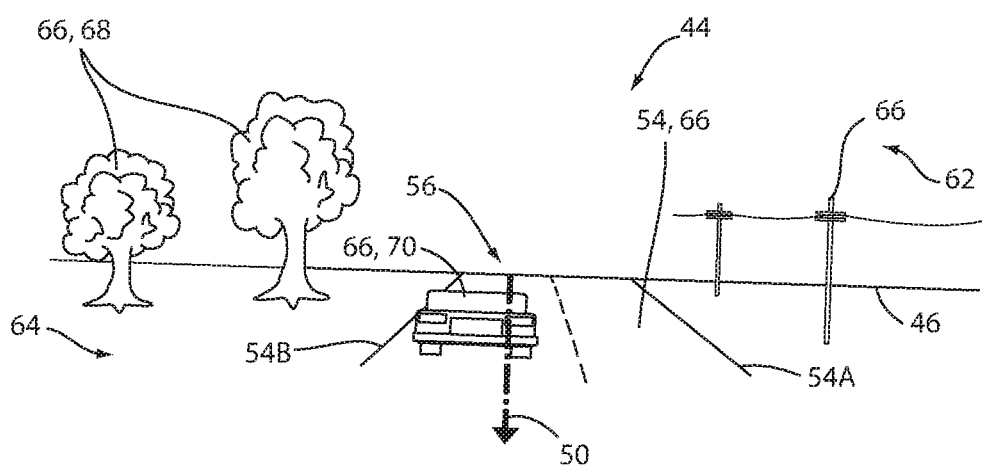
FIG. 3B is a diagram of image data captured in a field of view of an imager of a display system.

Referring to FIGS. 3A and 3B, diagrams of the display device 22 and the field of view 16 are shown, respectively. In operation, the controller of the system 12 may be in communication with the inertial sensor 40. The inertial sensor 40 may be disposed in or otherwise incorporated as a component of the display device 22. The inertial sensor 40 may be configured to detect the gravitational force vector 26 relative to the vertical display axis 28 of the display device 22. Similarly, the inertial sensor 40 may also measure the gravitational force vector 26 relative to a horizontal display axis 42 of any other reference direction. Accordingly, the display system 12 may be configured to measure an angular offset 6 of the display device 22 with respect to gravity.

Figure 3C:
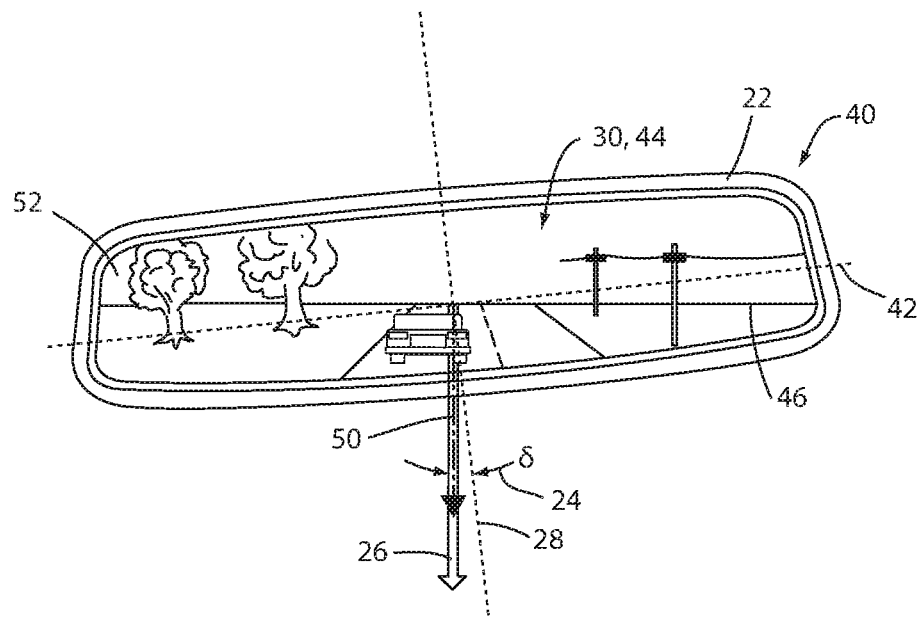
FIG. 3C is a diagram of a display device displaying image data corrected for a tilt of the display device.

In response to receiving the angular offset 6, the controller of the display system 12 may orient the image data 44 from the field of view 16 to display the adjusted view 30 as shown in FIG. 3C, which is further discussed in the following description. The controller may adjust the image data 44 from the field of view 16 based on a horizon line 46 or a reference direction 50 detected in the image data 44 received from the imager 14. The horizon line 46 and/or the reference direction 50 may be identified by the processor in response to one or more image processing techniques applied to the image data 44. In this way, the controller may be configured to determine the bearing or orientation of the reference direction 50. Though described in various exemplary embodiments as being generated based on the horizon line 46 or reference direction 50 and the gravitational force vector 26, the controller of the system 12 may also generate the adjusted view 30 independently based on either the gravitational force vector 26 or the horizon line 46. For example, the controller may align the image data 44 by orienting the image data 44 to align vertically with gravitational force vector 26. Additionally, the controller may align the image data 44 by orienting the image data 44 to align horizontally with the horizon line 46.

In some embodiments, the reference direction 50 may be assumed or configured during an initialization of the controller. For example, the reference direction 50 may be assumed to be parallel to a vertical axis of the image data 44, which may be perpendicular to a horizontal axis of the image data 44 to approximate the horizon line 46. Accordingly, if the controller is unable or inoperable to identify the reference direction 50 in the image data, the reference direction 50 may be assumed to be the vertical axis of the image data, which may be aligned by the controller to be parallel to the gravitational force vector 26. In this way, the reference direction 50 may be aligned with the gravitational force vector 26 without requiring the reference direction 50 to be identified in the image data. Based on the assumed or preconfigured reference direction 50, the controller of the display system 12 may detect changes in the gravitational force vector 26 and update the image data 44 to maintain a relationship to gravity such that the image data 44 generally appears level with the horizon.

Referring now to FIGS. 3A, 3B, and 3C, the controller may be configured to identify the horizon line 46, in the image data 44, to identify an angular orientation of the horizon line 46. The angular orientation of the horizon line 46 may be applied by the controller to determine a reference direction 50 for the gravitational force vector 26 detected by the inertial sensor 40. Accordingly, the controller may identify the reference direction 50 from the image data 44 and adjust or rotate the image data 44 to the adjusted view 30 such that the gravitational force vector 26 is aligned with the reference direction 50, as illustrated in FIG. 3C. In this way, the controller may be configured to orient and display the image data 44 on a display screen 52 of the display device 22 such that the horizon line 46 is arranged perpendicular to the gravitational force vector 26. In other words, by aligning the reference direction 50 of the image data 44 with gravitational force vector 26 measured by the inertial sensor 40, the controller of the system 12 may be operable to display the image data 44 level with the horizon line 46 regardless of the angular rotation or angular offset 6 of the display device 22 with respect to gravity.

Referring to FIG. 3B, in operation, the controller may also utilize a relative angle or slope of the horizon line 46, identified in the image data 44, to identify a rotational shift of the horizon line 46. In order to identify the horizon line 46 and the corresponding angular orientation of the horizon in the field of view 16, the controller may be configured to utilize various algorithms and methods. For example, the controller may be configured to utilize an adaptive edge detection process to identify the lanes and portions of a road 54 in order to identify a vanishing point 56 of the road 54, which may intersect with the horizon line 46. Additionally, the controller may be configured to utilize a boundary contrast algorithm to detect the horizon line 46 by detecting a gradient threshold of a series of pixel values of the image data 44. Though particular image processing methods are discussed herein, the methods are introduced for explanation and not limitation. As such, the disclosure shall not be limited to such exemplary embodiment unless expressly stated otherwise.

The adaptive edge detection process may utilize an edge detection mask to approximate a gradient at pixel locations in the image data 44. If a pixel meets predetermined criteria for an intensity value and a gradient threshold value, the controller may identify the pixels as a candidate lane line pixel. As the image data 44 corresponding to a current frame captured by the imager 14 is processed, the candidate lane line pixels may be utilized to generate a best-fit polynomial to model a lane line of the road 54. In some embodiments, the best-fit polynomial may correspond to a third order polynomial. In this way, the candidate lane line pixels may be utilized to generate a left lane line model 54A and a right lane line model 54B which may correspond to sides of the road 54. The left lane line model 54A and the right lane line model 54B model may be used to determine the intersection point of the sides of the road 54, which may correspond to the vanishing point 56 in the image data 44.

The controller may utilize the horizon boundary contrast algorithm to detect groups of pixels in the image data 44 in order to identify the horizon line 46. Each of the groups of pixels may correspond to portions or patches of contiguous pixels in the image data 44 that contain the boundary between a sky portion 62 and a ground portion 64 of image data 44. The horizon boundary contrast algorithm may analyze the contrast between the sky portion 62 and the ground portion 64 to determine a location of the horizon line 46. The contrast may be analyzed by calculating a pixel intensity vertically in the image data to determine a vertical gradient. The vertical gradient captures the difference in intensity or pixel values of the pixels corresponding to the sky portion 62 and those corresponding to the ground portion 64. By identifying the boundary of the sky portion 62 and the ground portion 64, the controller may be operable to identify the horizon line 46 in the image data 44.

In some embodiments, the controller may identify various features of the image data 44 to stabilize and/or limit variations in orientation of the image data 44 and the field of view 16. For example, the controller may be configured to detect one or more features 66 or objects in the image data 44. The features 66 may correspond to the horizon line 46, the vanishing point 56, a tree 68, a street sign, a vehicle 70, and any form of object that may be detected by the controller in a plurality of image frames of the image data 44. In this way, the controller may be configured to detect a variety of objects in the image data 44 to adjust for variations in the horizon line 46 to update the orientation of the image data 44 on the display screen 52.

In some embodiments, changes in the orientation of the horizon line 46 may result due to fluctuations in a surface of the road 54 (e.g., undulations, potholes, speed bumps, etc.). Under such circumstances, the controller may be configured to identify and/or track at least one feature 66 in the image data 44 from a first frame to a later frame. Based on the at least one feature 66, the controller may adjust the position and/or orientation of the adjusted view 30 to stabilize the appearance of the adjusted view 30 in the image data 44. In an exemplary embodiment, the controller may be operable to detect one or more objects (e.g., the tree 68, the vehicle 70, etc.) to determine and adjust the angular offset 6 to account for the movement of the at least one object or feature 66. In such embodiments, the one or more objects may be utilized selectively by the controller to offset the adjusted view 30 in response to one or more of the vanishing points 56 and the horizon line 46 being undetectable in the image data 44.

Systems demonstrating various detection techniques that may be implemented in the display system 12 are further discussed in detail in U.S. Pat. No. 9,767,695 entitled "STAND ALONE BLIND SPOT DETECTION SYSTEM," filed on Jul. 11, 2013, by Steven G Hoek et al.; U.S. Pat. No. 8,924,078, entitled "IMAGE ACQUISITION AND PROCESSING SYSTEM FOR VEHICLE EQUIPMENT CONTROL," filed on Oct. 17, 2011, by Oliver M. Jeromin et al.; U.S. Pat. No. 8,577,169, entitled "DIGITAL IMAGE PROCESSING AND SYSTEMS INCORPORATING THE SAME," filed on Feb. 1, 2010, by Jeremy C. Andrus et al.; U.S. Pat. No. 8,065,053 B2, entitled "IMAGE ACQUISITION AND PROCESSING SYSTEMS FOR VEHICLE EQUIPMENT CONTROL," filed on Jan. 31, 2011, by Joseph S. Stam et al.; and U.S. Pat. No. 8,543,254 B1, entitled "VEHICULAR IMAGING SYSTEM AND METHOD FOR DETERMINING ROADWAY WIDTH," filed Mar. 28, 2012, by Jeremy A. Schut et al., which are incorporated by reference herein in their entirety.

Referring now to FIG. 3C, the display device 22 is shown demonstrating the image data 44 adjusted by the angular offset 6 to display the adjusted view 30. As previously discussed, the controller may process the image data 44 captured by the imager 14 to generate the adjusted view 30. Particularly, the controller may process the image data 44 to identify the reference direction 50 based on the objects and/or the horizon line 46. With the reference direction 50, the controller may align the reference direction 50 of the image data 44 with the gravitational force vector 26 from the inertial sensor 40. In this way, the controller of the display system 12 may be configured to adjust the image data 44 to mirror the appearance of the field of view 16 when the display device 22 is tilted or angled relative to the horizon line 46 or a plane of operation of the vehicle 10.

In an exemplary embodiment, the adjusted view 30 of the image data 44 is generated by the controller in response to changes in the orientation of the vehicle 10 relative to the horizon line 46 and changes in the orientation of the display device 22 relative to gravity. In such embodiments, the controller may be configured to correct for multiple rotational offsets of the image data 44 by aligning the gravitational force vector 26 with the reference direction 50. In this way, the controller of the display device 22 is operable to correct for an angular orientation of the display device 22 relative to the vehicle 10 and also correct for a change in the angular orientation of the vehicle 10 relative to the horizon line 46. Accordingly, the display system 12 may be operable to orient the image data 44 to display the adjusted view 30 such that the image data 44 is to be displayed level with gravity to correct for the tilt 24 and variations in the operating surface of the vehicle 10.

Figure 4:
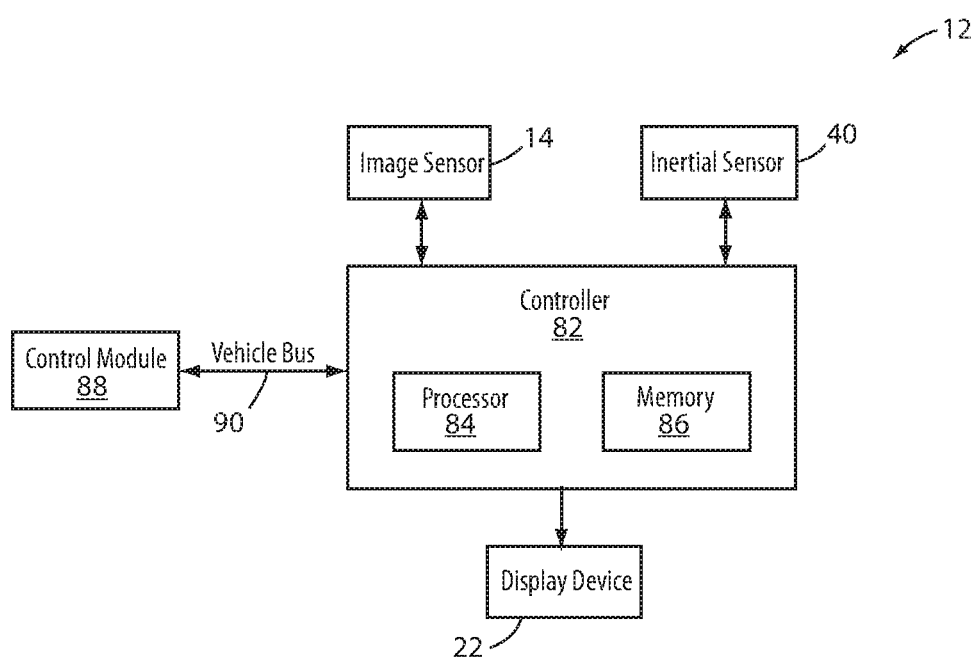
FIG. 4 is a block diagram of a display system in accordance with the disclosure.

Referring now to FIG. 4, a block diagram of the display system 12 is shown. The imager 14 is shown in communication with the controller 82. A pixel array of the imager 14 may correspond to a complementary metal-oxide-semiconductor (CMOS) image sensor, for example, a CMOS active-pixel sensor (APS) or a charge coupled device (CCD). Each of the pixels of the pixel array may correspond to a photo-sensor, an array of photo-sensors, or any grouping of sensors configured to capture light. The controller 82 may comprise a processor 84 operable to process the image data 44 as supplied in analog or digital form in the imager 14. For example, the controller 82 may be implemented as a plurality of processors, a multicore processor, or any combination of processors, circuits, and peripheral processing devices.

The controller 82 may further comprise a memory 86. The memory 86 may comprise various forms of memory, for example, random access memory (RAM), dynamic RAM (DRAM), synchronous DRAM (SDRAM), and other forms of memory configured to store digital information. The memory 86 may be configured to store the image data 44 for processing. Processing the image data 44 may comprise scaling and cropping the image data 44 to adjust a position and apparent size of the image data 44 as it is output to a screen of the display device 22. The display device 22 comprises a screen operable to display the adjusted view 30. The screen may correspond to any form of display, for example, a light-emitting diode (LED) display, liquid crystal display (LCD), organic LED (OLED) display, etc. In some embodiments, the memory 86 may further be configured to store a plurality of user profiles corresponding to a plurality of desired views.

The controller 82 may be in communication with a plurality of inputs. For example, the controller 82 may be in communication with a vehicle control module 88 via a vehicle bus 90. The vehicle control module 88 may be in communication with a variety of vehicle control, operation, and entertainment systems. For example, the controller 82 may be operable to identify a vehicle operating condition, speed, direction, a light or turn indicator status, etc. based on communications received via the vehicle bus 90. The vehicle bus 90 may be implemented using any suitable standard communication bus, such as a Controller Area Network (CAN) bus. The vehicle bus 90 may also be configured to provide a variety of additional information to the controller 82.

As previously discussed, the inertial sensor 40 may correspond to or comprise an accelerometer. The accelerometer may comprise a 3-axis accelerometer and may be configured to measure a range of approximately +/−4 g at a resolution of approximately 16-bits. The accelerometer may further be operable to operate in a wide range of temperatures and have an effective sampling rate of approximately 25 Hz. Accordingly, the inertial sensor 40 may output an acceleration signal to a controller of the display system 12. Based on the acceleration signal, the controller 82 may identify the gravitational force vector 26 and compute the direction of gravity in relation to the vertical display axis 28 of the display device 22. Accordingly, though described as the gravitational force vector 26 herein, the controller 82 may utilize the gravitational force vector 26 to identify the direction of gravity in relation to the vertical display axis 28 or any other reference direction of the display device 22. Though specific performance characteristics corresponding to the accelerometer are discussed herein, a variety of accelerometers may be utilized according to the particular precision, operating parameters of the controller 82, and the operating conditions/environments of the vehicle 10.

In some embodiments, the system 12 may further be in communication with an additional inertial sensor configured to communicate inertial data or yaw sensor data to the controller 82. For example, the additional inertial sensor may correspond to a gyroscope or yaw sensor in communication with the vehicle control module 88. Additionally, the controller 82 may be configured to receive steering angle data from a steering angle sensor of the vehicle 10. The additional inertial data and/or the steering angle may be communicated from the vehicle control module 88 via the vehicle bus 90.

In operation, the controller 82 may process the additional inertial data or steering data communicated via the vehicle bus 90 to identify temporal periods or occasions when the gravitational force vector 26 may deviate from the true direction of gravity. For example, the controller 82 may process the additional inertial data and/or the steering data to identify periods when the vehicle 10 is undertaking a sharp turn, resulting in the gravitational force vector 26 detected by the inertial sensor 40 deviating from the true direction of gravity due to centrifugal forces. Accordingly, the controller 82 may correct for or filter the correction of the image data 44 to accurately process and display the adjusted view 30 based on the additional inertial data and/or the steering data. In this way, the controller 82 may improve the accuracy of the processing and generation of the adjusted view 30.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but, are not limited to, signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above-described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

What is claimed is:

1. A display system for a vehicle, comprising:
   a display device comprising a screen disposed in a passenger compartment of the vehicle, wherein the display device is configured to tilt relative to the vehicle and comprises an inertial sensor configured to output an acceleration signal;

a controller in communication with the display device and an imager configured to capture image data in a field of view rearward relative to the vehicle, wherein the controller is configured to:

receive the acceleration signal;

identify a direction of gravity from the acceleration signal;

identify a reference direction from the image data;

generate adjusted image data corrected for an angular offset of the display device between the direction of gravity and changes in the reference direction resulting from movement of the vehicle; and display the adjusted image data in accordance with the reference direction on the display device.

2. The system according to claim 1, wherein the controller is further configured to: identify a horizon direction in the image data, wherein the reference direction is identified relative to the horizon direction.

3. The system according to claim 2, wherein the controller is further configured to: detect at least one lane line in the image data based on a gradient threshold of the image data.

4. The system according to claim 3, wherein the horizon line is identified based on a vanishing point of the lane line detected in the image data.

5. The system according to claim 2, wherein the horizon direction is identified in the image data based on a change in contrast between a ground portion and a sky portion identified in the image data.

6. The system according to claim 2, wherein the reference direction is identified perpendicular to the horizon direction.

7. The system according to claim 6, wherein the angular offset is identified by comparing the reference direction to the direction of gravity.

8. The display system according to claim 7, wherein the adjusted view is generated by rotating the image data by the angular offset.

9. The display system according to claim 6, wherein the adjusted image data is calculated by adjusting the reference direction to align with the direction of gravity.

10. The display system according to claim 1, wherein the display device corresponds to a rearview display device.

11. A method for displaying image data on a vehicle display:

detecting an angular orientation of the vehicle display relative to a vehicle;

capturing image data in a field of view proximate to the vehicle;

detecting at least one feature in the image data;

identifying a reference direction based on the at least one feature;

comparing the reference direction to the angular orientation of the vehicle display generating a display offset;

offsetting a display orientation of the image data by the display offset generating offset image data, wherein the offset image data is corrected based on changes in the reference direction resulting from movement of the vehicle; and displaying the offset image data on the vehicle display in accordance with the reference direction.

12. The method according to claim 11, wherein the angular orientation of the vehicle display is identified by detecting a direction of gravity with an inertial sensor.

13. The method according to claim 11, wherein the at least one feature comprises a horizon direction in the image data.

14. The method according to claim 13, further comprising: detecting at least one lane line in the image data; and calculating a vanishing point of the at least one lane line.

15. The method according to claim 14, wherein the horizon direction is identified based on the vanishing point of the lane line.

16. The method according to claim 15, wherein the at least one lane line comprises a plurality of lane lines, and wherein the vanishing point is calculated based on an intersection of the lane lines.

17. The method according to claim 16, wherein the intersection is calculated based on a polynomial model estimation of the intersection of the lane lines.

18. The method according to claim 13, wherein the horizon direction is identified in the image data based on a change in contrast between a ground portion and a sky portion identified in the image data.

19. A display system for a vehicle, comprising:

a display device comprising a screen disposed in a passenger compartment of the vehicle, wherein the display device is configured to rotate relative to the vehicle and comprises an inertial sensor configured to output an acceleration signal, wherein the acceleration signal is configured to identify an angular orientation of the display device relative to the vehicle;

a controller in communication with the display device and an imager configured to capture image data in a field of view rearward relative to the vehicle, wherein the controller is configured to:

receive the acceleration signal;

identify a direction of gravity based on the acceleration signal;

identify a plurality of lane lines in the image data;

calculate an intersection of the lane lines;

identify a horizon direction based on the intersection of the lane lines;

generate adjusted image data corrected for an angular offset of the display device between the direction of gravity and changes in the horizon direction resulting from movement of the vehicle; and display the adjusted image data in accordance with the reference direction on the display device.

20. The system according to claim 19, wherein the controller is further configured to: model each of the lane lines based on a best fit polynomial estimation, wherein the intersection of the lane lines is calculated based on the polynomial estimation.

* * * * *